United States Patent [19]
Cirigliano et al.

[11] Patent Number: 6,156,362
[45] Date of Patent: *Dec. 5, 2000

[54] NATAMYCIN AND CHEMICAL PRESERVATIVES IN FOODS AND METHOD OF MAKING

[75] Inventors: Michael Charles Cirigliano, Cresskill; Raymond Thomas McKenna, Scotch Plains; Andreas Markus Keller, Ridgefield, all of N.J.

[73] Assignee: Lipton, division of Conopco, Inc., Englewood Cliffs, N.J.

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 09/183,942

[22] Filed: Nov. 2, 1998

[51] Int. Cl.[7] ............................ A23L 3/3463; A23L 3/34
[52] U.S. Cl. .................. 426/335; 426/42; 426/330.3; 426/477; 426/580; 426/589; 426/590; 426/603; 426/654
[58] Field of Search ..................... 426/335, 42, 330.3, 426/477, 654, 589, 580, 590, 603

[56] References Cited

U.S. PATENT DOCUMENTS

| | | | |
|---|---|---|---|
| 4,600,706 | 7/1986 | Carter | 514/31 |
| 4,664,861 | 5/1987 | Pritikin et al. | 264/173 |
| 4,917,915 | 4/1990 | Cain et al. | 426/573 |
| 4,956,193 | 9/1990 | Cain et al. | 426/573 |
| 5,064,677 | 11/1991 | Cain et al. | 42/611 |
| 5,196,344 | 3/1993 | Rattan | 436/38 |
| 5,302,408 | 4/1994 | Cain et al. | 426/603 |
| 5,451,422 | 9/1995 | Cain et al. | 426/602 |
| 5,895,681 | 4/1999 | Cirigliano et al. | 426/335 |

OTHER PUBLICATIONS

Giese, J., "Antimicrobials: Assuring Food Safety", Food Technology 48 (6), pps 102–110 (Jun. 1994).
Morris et al., "Pimarcin—What Is It?", Culture Dairy Products Journal, vol. 13, pps 22–23 (Aug. 1987).
The Merck Index, Tenth Edition, published by Merck & Co., entry No. 6278, p 922 (1983).

*Primary Examiner*—Helen Pratt
*Attorney, Agent, or Firm*—James J. Farrell

[57] ABSTRACT

A foodstuff is disclosed which also contains a sufficient amount of Natamycin in combination with reduced levels of selected chemical preservatives to prevent the outgrowth of yeast, mold and/or bacteria making the foodstuff significantly more organoleptically acceptable.

14 Claims, No Drawings

NATAMYCIN AND CHEMICAL PRESERVATIVES IN FOODS AND METHOD OF MAKING

BACKGROUND OF THE INVENTION

1. Field of the Invention

The present invention relates to the use of a natural preservative, Natamycin, in combination with chemical preservatives such as sorbates, benzoates, parabens and the like, in foodstuffs such as dressings, sauces, marinades, condiments, spreads, margarine, dairy based foods and the like. The foodstuffs under some conditions are subject to microbial spoilage.

"Food preservation", as that term is used herein, includes methods which guard against food poisoning as well as methods which delay or prevent food spoilage due to microbes. Food preservation keeps food safe for consumption and inhibits or prevents nutrient deterioration or organoleptic changes causing food to become less palatable.

"Food spoilage", as that term is used herein, includes any alteration in the condition of food which makes it less palatable including changes in taste, smell, texture or appearance. Spoiled food may or may not be unsafe.

Prevention of food spoilage has been attempted throughout history often through trial and error. The early attempts have resulted in the adoption of such food preservation methods as the drying, salting and/or smoking of foods in order to preserve them. It has been relatively recent in recorded history that food preservation has been placed upon a scientific foundation.

Present food technologists utilize an array of physical, chemical and biological processes and agents to preserve food and prevent the transmission of disease via foodstuffs. Many chemical agents exist. These agents include antioxidants to prevent chemical degradation of food, as well as compositions which kill or inhibit deleterious bacteria and/or other microbes thereby preserving food, i.e., preventing both spoilage and the transmission of disease.

Of rising concern in the food process industry is yeast, mold and bacterial spoilage of various foods such as cheese, dairy products including novelty ice cream, dressings, spreads, margarine and seafood. Of particular concern is evidence that pasteurized and fully cooked processed foods are being contaminated with microbes following cooking or pasteurization and prior to packaging for point of sale.

Food preservation by inhibition of growth of yeasts, molds and lactobacilli and other spoilage bacteria is often difficult. Further in those instances where a food has been thermally processed, microorganism contamination may occur following pasteurization by the processor. Acidified and native pH salad dressings, sauces, marinades, spreads, margarines and other dairy based foods and beverages in the 2.0 to 7.0 pH range are known to be susceptible to spoilage by yeast, mold, acid tolerant bacteria and/or mesophilic or thermophilic spore forming and non-spore forming bacteria.

Many foods, like dressings, spreads and margarines, are designed for consumption over time, after opening, making them subject to post processing microbial contamination. Further, many people eat foods that have been thermally processed after a significant period of time has elapsed from a first cooking or pasteurization by the food manufacturer thereby permitting bacteria introduced by post-pasteurization contamination to grow. Since in this latter instance food consumption may occur without reheating the processed food to sufficient temperatures for sufficient time to kill any microbes which may have been introduced subsequent to initial cooking, there is a risk of food spoilage. The present invention seeks to ameliorate the aforementioned risks.

2. Related Art

Natamycin, also known as pimaricin, is an antifungal agent produced by *Streptomyces natalensis*. This compound is effective against yeasts and molds and is reported to be ineffective against bacteria. It is approved for use as an additive which may be applied to the surface of cuts and slices of cheese to inhibit mold spoilage (21 C.F.R. 172.155). This information is available from an article on "Antimicrobials: Assuring Food Safety" by J. Giese in the June 1994 Food Technology periodical 48 (6) pp.101–110.

Natamycin has been used in animal feeds, U.S. Pat. No. 4,600,706, in sausage casings, U.S. Pat. No. 4,664,861, and in mixtures with other preservatives to preserve milk, U.S. Pat. No. 5,196,344.

Generally, however, the solubility of Natamycin has limited its use to the surface treatment of cheese for which it is approved by the FDA.

Natamycin has also been of interest in the treatment of food products because it is highly active against yeast and molds, as opposed to bacteria (see Morris and Hart, "Pimaricin—What Is It?", Culture Dairy Products Journal, Volume 13, page 22, 1987). Reportedly, Natamycin has been applied to food products in several ways. It has been added in dry form to liquids, slurries, pastes and semisolids when adequate mixing can be accomplished, or the pure Natamycin can be mixed with one or more of the dry ingredients and then added to a given food product. Solid foods requiring surface protection can be dipped, misted, fogged or dusted with a solution or suspension of Natamycin. Additionally, it has been suggested that protection from yeast and mold may be achieved in solid food by incorporating Natamycin homogeneously into the food itself.

Natamycin has also been used to retard spoilage of dressed poultry, to protect cottage cheese, and has been widely used in the dip-treatment of cheeses to coat them with the fungicide which is absorbed slightly, and dries to form a solid, surface coating. Various other reports suggest that Natamycin is effective in the treatment of fresh berries, tomatoes, strawberries and raspberries. These reports indicate that Natamycin has an anti-yeast activity when added to wines, and various fruit juices, such as apple juice or orange juice. (See Morris and Hart, cited above.)

SUMMARY OF THE INVENTION

Brief Description of the Invention

Many preservatives are readily available for many diverse uses. Some foods, however, because of their delicate balance of flavors require the utmost care in selecting preservatives. In addition, many foods are difficult systems to stabilize particularly against eucaryotic organisms such as mold and yeast which have a competitive advantage in many of these foods. A fine balance must thus be achieved in stabilizing foods without deleteriously affecting their flavor.

A method for preserving foods for distribution and sale at ambient or chilled temperatures is disclosed. The method uses Natamycin (pimaricin) to prevent microbial spoilage in combination with chemical preservatives. Acidified and native pH foods in the 2.0–7.0 pH range are known to be susceptible to spoilage by yeast, mold and bacteria. Natamycin, when introduced into various foods in its commercial form (as "Delvocid"—a 50/50 blend with lactose or sodium chloride), together with chemical preservatives such as e.g., potassium sorbate at concentrations ranging from 5–125 ppm Natamycin and about 50–500 ppm chemical preservative preferably as the salt, are expected to completely inhibit the outgrowth of yeast and significantly delay, or completely inhibit (depending on concentration degree and scope of product susceptibility, microorganism insult level and other factors), mold and lactobacilli spoilage. As the pH increases above about 4.0 levels of chemical preservative higher than 500 ppm may be necessary. Possibly as high as 1000 ppm or more. Similarly more Natamycin may also be required, for example, possibly up to 500 ppm.

The stability and ostensibly the efficacy of the Natamycin (reported to be sensitive to oxidation) in combination with selected chemical preservatives appears to be enhanced in the presence of antioxidants and/or for oxygen scavengers (such as ascorbic acid and the like). Several of the preferred embodiments of foods thus include ascorbic acid, a known oxygen scavenger, which contributes to this effect.

Heavy and divalent metals are also reported to adversely affect the stability of Natamycin. One preferred embodiment incorporates citric acid a natural sequestrant. This is further enhanced by the incorporation of other sequestering agents and/or by water hardness control which removes heavy metals as well as divalent metals. This negates the effect and sustains the efficacy of the Natamycin in the system. Other sequestering agents such as EDTA and its organic and inorganic salts e.g. sodium and the like, metaphosphoric acid salts, polyphosphoric acid salts, tartaric acid salts and phosphoric acid may also be used to sustain system efficacy over time, where water hardness control is not absolute.

Further, the simple expedient of incorporating a concentration of Natamycin, preferably 1.5 times or even more in excess of its maximum solubility, also significantly enhanced its effect, ostensibly by providing a "preservative" reserve buffer.

Natamycin, a fermentation by-product that is a naturally derived antimicrobial, thus affords an opportunity to stabilize certain foodstuffs.

Natamycin is a creamy white, odorless, tasteless, practically insoluble crystalline amphoteric powder. It belongs to the polyene macrolide or macrycyclic lactone group of compounds. In low concentrations, Natamycin is a potent inhibitor of fungal microorganisms.

Natamycin is relatively stable when in a dry state or when mixed with dry diluents. However, the molecule is sensitive to ultraviolet light, oxygen, or extreme pH values. It is relatively insoluble in water in which its solubility is of the order 0.005–0.010 weight/weight percent. Additionally, even in solution, Natamycin is rather unstable. Aqueous solutions of 16 mcg/ml of Natamycin became microbiologically inactive after 24 hour exposure to light. Inactivation of Natamycin by light, peroxides or oxygen proceeds at the fastest rate in solution or suspension. Natamycin is also sensitive to heavy metals, and it may lose up to 75% of its effectiveness in 4–5 hours in their presence.

Natamycin is also referred to by other names, e.g., Pimaricin, antibiotic A 5283, tennecetin, CL 12625, Mycrophyt, Myprozine, Natacyn and Pimafucin. Naturally, the present invention extends to compositions employing Natamycin under any of its alternative names or designations. The antibiotic is currently available from a number of companies under various trademarks, e.g. from Gist-brocades Food Ingredients, Inc. of King of Prussia, Pa. under the trademark DELVOCID®). Further details of the antibiotic can be found in The Merck Index, Tenth Edition, 1983, published by Merck & Co., Inc., entry no. 6278, page 922.

The chemical preservatives which may be employed are preferably sorbic acid and benzoic acid such as the sodium or potassium salts. Parabenzoic acid esters or parabans are also very effective. The preservative is effective in its acidic form and thus any method or compound by which it can be incorporated into a food may be used. Thus, the various salts and other compounds of preservatives may be usefully employed. The amount of preservative is about 5 to 500 ppm and preferably about 5 to 250 ppm for organoleptic effects.

The addition of about 50 ppm of Natamycin and 100 to 500 ppm of chemical preservative to foods is expected to reduce or completely eliminate yeast, mold and/or bacterial outgrowth in the food in the time frame required for commercial sale and consumption, i.e. for about 3 to 6 months or longer depending on the food and its distribution sale and use conditions.

The advantage of using the Natamycin combination is that it allows the reduction of chemical preservatives thereby making a microbiologically stable food which is also significantly more organoleptically acceptable than those containing higher levels of chemical preservatives.

The method of the invention employs a preservative system including Natamycin (pimaricin) and selected chemical preservatives to preserve foodstuffs such as sauces, dressings, marinades, dairy products, spreads, margarines and the like.

The novel antimicrobial composition is expected to have good antimicrobial properties. Additionally, the inventive composition surprisingly is expected to be able to prolong food shelf life by preventing food spoilage for a long period of time. The amount of Natamycin employed will depend on the amount of water in the foodstuff to be preserved. In a margarine containing only about 20% water, 10 ppm Natamycin may be as effective as 50 ppm Natamycin in a dressing containing 85 to 90% water. The amount of preservative used is directly proportional to the amount of water available in the food. Thus, about 10 to 500 ppm Natamycin or more may be used and preferably about 50 to 500 ppm or more based on the water content.

The preservation technology can be used to effect microbiological stability and/or safety in foods distributed at ambient (or chilled temperatures) and requiring chemical preservations, a thermal process, strict chill chain control, or other technology to prevent yeast and/or mold spoilage as well as the other foodstuff systems mentioned.

The addition of Natamycin in combination with chemical preservatives to foodstuffs is expected to reduce or completely eliminate mold and yeast outgrowth in the foodstuff in the time frame required for commercial sale. This time frame varies considerably with the type of food, the distribution and sale conditions (e.g., chilled vs. ambient) and the like. Examples of spreads that are expected to be improved by the addition of Natamycin are those taught by U.S. Pat. No. 4,956,193; U.S. Pat. No. 5,451,422; U.S. Pat. No. 5,064,677; U.S. Pat. No. 4,917,915 and U.S. Pat. No. 5,302,408. Other spreads are also expected to benefit.

All parts and proportions herein and in the appended claims are by weight unless otherwise indicated.

EXAMPLE 1

An Italian salad dressing formulation is prepared as follows:

|        | Components            | %      |
|--------|-----------------------|--------|
| Part 1 | Water                 | 70.0   |
|        | Vinegar               | 7.0    |
|        | Sodium Chloride       | 2.0    |
|        | Sweetener             | 4.0    |
|        | Gum                   | 0.4    |
|        | Flavors               | 0.9    |
| Part 2 | Vegetable Oil         | 5.3    |
|        | Natamycin             | varies |
|        | Chemical preservatives| varies |
| Part 3 | Water                 | 4.3    |
|        | Vinegar               | 4.27   |
|        | Gum                   | 0.03   |
|        | Spices and Flavors    | 1.80   |

Parts 1 and 2 are mixed and homogenized. Part 3 is then added and thoroughly mixed to form a homogenous mixture.

400 ppm of Delvocid® is added to the dressing formula as above (200 ppm Natamycin) together with 300 ppm of potassium sorbate and 100 ppm of sodium benzoate. Samples of the dressing are then inoculated with yeast organisms. The effect of the composition is observed over a period of time and is expected to prevent outgrowth of mold, yeast and bacteria. Further compositions are prepared as above with varying amounts of Natamycin and chemical preservatives. The microbiological stability of these compositions is expected to be good.

EXAMPLE 2

|                          | % by wt. |
|--------------------------|----------|
| aqueous phase            |          |
| ground tomato            | 25.9     |
| cider vinegar            | 20.7     |
| water                    | 44.2     |
| sundried tomatoes        | 2.1      |
| sodium chloride          | 1.8      |
| dehydrated minced garlic | 1.1      |
| frozen oregano           | .4       |
| basil                    | .5       |
| xanthan gum              | .2       |
| white onion powder       | 2.5      |
| sucrose                  | .7       |
| EDTA                     | .0007    |
| Sorbic acid              | .08      |
| Sodium benzoate granular | .1       |
| oil phase                |          |
| soybean oil              | 53.3     |
| olive oil                | 46.7     |

Various percentages of Natamycin are added and the final product is expected to have good microbiological stability.

EXAMPLE 3

A spread formulation is prepared as follows with the components of Table 1.

TABLE 1

| Ingredients | % wt. in Product |
|---|---|
| oil phase | 40.0 |
| Lecithin | 0.2 |
| saturated distilled monoglycerides iodine value = <5 | 0.25 |
| flavor (artificial butter) | 0.008 |
| beta carotene and vitamin A | 0.007 |
| fat blend - partially hydrogenated bean oil and liquid oil | 39.5 |
| aqueous phase | 59.958 |
| maltodextrin - Paselli Excel | 3.500 |
| alginate - Manucol VDU | 0.700 |
| gelatin pork - 250 bloom | 2.500 |
| spray dried butter milk | 0.250 |
| EDTA, calcium sodium | 0.006 |
| lactic acid (88%) | 0.070 |
| K sorbate | 0.100 |
| salt | 1.500 |
| water | 51.332 |

Skim milk, buttermilk powder and potassium sorbate is added to dissolve.

Lactic acid together with 200 ppm Natamycin is added to obtain a pH of 5.0 and the oil is added to the mixture which is still maintained at 60° C. The composition is then passed through a scraped surface heat exchanger to pasteurize it. The composition is pasteurized at 85° C. for 15 seconds. The pasteurized composition is again passed through a scraped surface heat exchanger and cooled to 7–20° C. The composition is inverted to a fat continuous emulsion using a high speed crystallizer and further cooled to a temperature of 7–18° C. by again passing through a scraped surface heat exchanger. The composition is packed into stick form and stored at 5° C.

The composition is expected to be mold and yeast free after six months storage at refrigerated temperatures.

Two spread formulations with the following compositions are prepared.

EXAMPLE 4

| Base Spread Formulation A | |
|---|---|
| Oil (partially hydrogenated + liquid oil mix) | 24.0% |
| Gelatin | 3.0% |
| Rice Starch | 1.0% |
| Salt | 1.0% |
| Potassium Sorbate | 0.1% |
| Water | 70.1% |
| Lactic Acid | sufficient to adjust to pH 4.9 |
| Base Spread Formulation B | |
| Oil (partially hydrogenated + liquid oil mix) | 26.0% |
| Gelatin | 3.0% |
| Rice Starch | 1.0% |
| Salt | 1.0% |
| Potassium sorbate | 0.1% |
| Water | 68.1% |
| Lactic Acid | . . . sufficient to adjust to pH 4.9 |

The above two formulae are treated with 0, 5, 10, and 15 ppm natamycin (using 0, 10, 20 and 30 ppm "Delvocid", i.e. Gist-brocades 50/50, natamycin/sodium chloride blend) and are "surface" challenged with 9 strains of "spoilage" mold. They are expected to be stable.

Although the invention has been described in detail with respect to preferred embodiments thereof, variations and modifications will be readily apparent to those skilled in the art without departing from the spirit and scope of the inventions as set forth in the claims.

What is claimed is:

1. A foodstuff comprising a sufficient amount to prevent microbial spoilage of a combination of Natamycin with a preservative selected from the group consisting of sorbic acid, benzoic acid, sorbate, benzoate, parabens and/or mixtures thereof, said foodstuff having a pH of about 2.0 to 7.0.

2. A foodstuff as defined in claim 1 wherein said Natamycin is present in an amount of at least about 5 to 125 ppm.

3. A foodstuff as defined in claim 1 having sufficient Natamycin to completely inhibit the outgrowth of yeast and mold.

4. A foodstuff as defined in claim 1 further comprising sufficient antioxidants to result in a significant antioxidant effect.

5. A foodstuff as defined in claim 1 wherein said Natamycin is present in an amount of at least about 1.5 times the maximum solubility of said Natamycin in the foodstuff.

6. A foodstuff as defined in claim 1 wherein a metal sequestrant is present in an amount sufficient to reduce the effect on the Natamycin of solubilized metals.

7. A foodstuff as defined in claim 1 further comprising a flavoring agent.

8. A foodstuff as defined in claim 1 wherein the water used to prepare the foodstuff is treated to reduce the water hardness to a level of at least about 120 ppm or less measured as calcium carbonate.

9. A method of improving the stability of foodstuffs to prevent yeast, mold and/or bacterial growth for a period of up to 6 months which comprises blending about 5 to about 125 ppm of Natamycin and about 5 to 500 ppm of a preservative selected from the group consisting of sorbic acid, benzoic acid, parabens and/or mixtures thereof into the foodstuff.

10. A liquid foodstuff having 5 to 500 ppm of a preservative selected from the group consisting of sorbic acid, benzoic acid, parabens and/or mixtures thereof, a pH of 2.0 to 7.0 and at least about 5–125 ppm of Natamycin.

11. A foodstuff as defined in claim 1 wherein said food material is selected from the group consisting of dressings, sauces, marinades, spreads, margarine and dairy based foods and beverages.

12. A foodstuff as defined in claim 1 wherein said Natamycin is present in an amount of at least 10 to 500 ppm based on the water content of the foodstuff.

13. A foodstuff as defined in claim 1 comprising a dressing having 0% to about 60% fat and having a pH of about 2.5 to 4.5.

14. A foodstuff as defined in claim 1 comprising a spread having from 0% to about 80% fat.

* * * * *